(12) United States Patent
Becker et al.

(10) Patent No.: US 8,374,934 B1
(45) Date of Patent: Feb. 12, 2013

(54) CREDIT CARD RELATIONSHIP DERIVATION (ACCTID) FROM HISTORIC DATA

(75) Inventors: Glen Becker, San Antonio, TX (US); Yifan Cui, Helotes, TX (US); Charlotte Hamner, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 77 days.

(21) Appl. No.: 12/968,921

(22) Filed: Dec. 15, 2010

(51) Int. Cl.
*G06Q 40/00* (2012.01)
(52) U.S. Cl. .......................................... 705/35; 705/38
(58) Field of Classification Search .................... 705/35, 705/38
See application file for complete search history.

(56) References Cited

U.S. PATENT DOCUMENTS

| | | | |
|---|---|---|---|
| 7,552,074 B2 | 6/2009 | Bruce et al. | |
| 7,680,728 B2 * | 3/2010 | Lazerson | 705/38 |
| 7,877,304 B1 * | 1/2011 | Coulter | 705/35 |
| 2008/0091540 A1 | 4/2008 | Blagg et al. | |
| 2008/0277465 A1 | 11/2008 | Pletz et al. | |
| 2010/0036769 A1 | 2/2010 | Winters et al. | |

OTHER PUBLICATIONS

By Henry Gilgoff, S. W. (Jan. 26, 1992). Credit reporters under siege facing a barrage of criticism from consumers, information companies try to stave off tighter regulation. SIDEBAR: Free credit report proposal draws debate (see end of text). Newsday, pp. 68-68. Retrieved Sep. 27, 2012.*

* cited by examiner

*Primary Examiner* — Kito R Robinson
(74) *Attorney, Agent, or Firm* — Perkins Coie LLP

(57) ABSTRACT

Systems and methods for credit card relationship derivation from historic data are provided. A single credit card relationship between a membership organization and a member can be very long-lived and identified by many different account numbers over time. For example, a new card with a new number can be issued if the card is lost, stolen, the member changes the card type (Standard, Gold or Platinum) or the card number is thought to be compromised. Sometimes, data security compromises committed by third-parties can result in a simultaneous mass re-issue of many cards. Various embodiments of the present invention create a common key and ordinal numbers that identifies the account throughout its life by resolving ambiguities and inconsistencies in historical data.

20 Claims, 8 Drawing Sheets

CREDIT CARD RELATIONSHIP DERIVATION (ACCTID) FROM HISTORIC DATA

TECHNICAL FIELD

Various embodiments of the present invention generally relate to credit card relationships. More specifically, various embodiments relate to credit card relationship derivation from historic data.

BACKGROUND

A single credit card relationship between a credit card issuer and a member can be very long-lived. As a result, the relationship can include many different account numbers over time. For example, a new card with a new number can be issued if the card is lost, stolen, the member changes the card type (Standard, Gold or Platinum), or the card number is thought to be compromised. Sometimes, data security compromises committed by third-parties can result in a simultaneous mass re-issue of many cards.

Unfortunately, historic credit card data can contain inconsistent and erroneous relationships between credit card accounts and their predecessors and successors. The problem is compounded by the fact that historic relationships are only available as monthly snapshots, and there is no clear way to tell exactly when a card was issued, because the issue dates are only accurate within about 10 days, and not necessarily in the correct order. This creates the need for ways to identify and track the account throughout its life.

SUMMARY

Systems and methods are described for deriving a credit card relationship from historic data. In some embodiments, a method receives, on a periodic basis, a current file of historic data for a plurality of credit card accounts. The historic data can contain account level data such as, but not limited to, a current account number, an account predecessor, an account successor, and/or an external status (e.g., active, lost, stolen, or rescinded). A subset of the plurality of credit card accounts that contains incorrect account level data can be constructed. For example, in various embodiments, a credit card checksum test can be performed on the plurality of credit card accounts. Each of the plurality of credit card accounts fail the credit card checksum test can be recorded. As another example, a recording can be made as to which of the plurality of credit card accounts list the current account number as the account predecessor or the account successor.

A modified file can be created from the current file with the subset of the plurality of credit card accounts marked as inaccurate. In some embodiments, the modified file also has known inconsistencies corrected. For example, a duality conversion can be used to convert a Visa card number to a MasterCard number when this inconsistency is identified. An ID table can be generated from an immediately prior file. The ID table can include account numbers, unique account id's associated with the account numbers, a member number, and a date stamp.

Each of the current account numbers in the modified file can be associated with a unique account id and an ordinal number representing the current account number's place (or order) in a relationship chain. In some embodiments, one of the unique account id's listed in the ID table is associated with the one of the current account numbers if the current account number is listed as one of the account numbers in the ID table.

A new unique account id can be assigned if the account predecessor is not indicated. One of the unique account id's can be associated with one of the current account numbers if the account predecessor is in the ID table and the member number of the account predecessor matches the member number of the current account.

A tentative order can be created for each of the unique account id's based on a scoring model by iteratively processing chains of succession of unresolved credit cards listed in the modified file. The tentative order is reconciled with any permanent order developed in any previous file to create a card account relationship. In accordance with various embodiments, to create the tentative order the method can determine a set of starting places for each unique account id. Starting with each of the starting places, a chain of succession can be developed by matching the account predecessor of one of the plurality of credit card accounts with the account successor of one of the plurality of credit card accounts until a terminator is located. Every branch in the chain of succession can be searched by processing and stacking every unsearched relation until a terminator is located.

If no starting places are available, then every relation can be iteratively processed and stacked to create a chain of succession by matching the account predecessor of one of the plurality of credit card accounts with the account successor of one of the plurality of credit card accounts until a terminator is located. Then, every branch in the chain of succession can be searched by processing and stacking every unsearched relation until a terminator is located. A score can be assigned to each chain of succession that is non-circular. In accordance with one or more embodiments, the score can be computed using the number of relations and a chain score based on the account predecessor, the account successor, and the external status. A credit risk analysis can be performed based on the card account relationship.

Embodiments of the present invention also include computer-readable storage media containing sets of instructions to cause one or more processors to perform the methods, variations of the methods, and other operations described herein.

Various embodiments provide for a system comprising an account history receiving module, an identification module, a file modification module, a table generation module, a table generation module, an association module, an ordering module, and a reconciliation module. The account history receiving module can receive, on a periodic basis (e.g., monthly), a current file containing account level data for a plurality of credit card accounts. The account level data can include a current account number, an account predecessor, an account successor, and/or an external status. The identification module can identify a subset of the plurality of credit card accounts that contain incorrect account level data.

In one or more embodiments, for example, a checksum module can perform a credit card checksum test on the plurality of credit card accounts and record which of the plurality of credit card accounts fail the credit card checksum test. A relation checking module can also be used to record which of the plurality of credit card accounts list the current account number as the account predecessor or the account successor. A duality conversion module can convert a Visa card number to a MasterCard number when this is identified as an inconsistency. The file modification module can create a modified file from the current file with the subset of the plurality of credit card accounts marked as inaccurate and by correcting known inconsistencies.

The table generation module can generate, from an immediately prior file, an ID table. The ID table can include account numbers, unique account id's associated with the account numbers, a member number, and/or a date stamp. The association module can associate with each of the current account numbers in the modified file a unique account id and an ordinal number. In some embodiments, one of the unique account id's listed in the ID table can be associated with the one of the current account numbers if the current account number is listed as one of the account numbers in the ID table. A new unique account id can be assigned if the account predecessor is not indicated. One of the unique account id's can be associated with one of the current account numbers if the account predecessor is in the ID table and the member number of the account predecessor matches the member number of the current account.

The ordering module can create a tentative order for each of the unique account id's based on a scoring model by iteratively processing chains of succession of unresolved credit cards listed in the modified file. For example, the ordering module can determine a set of starting places for each unique account id and iteratively process and stack a relation starting with one of the starting places in the set of starting places. This creates a chain of succession by matching the account predecessor of one of the plurality of credit card accounts with the account successor of one of the plurality of credit card accounts until a terminator is located. Every branch in the chain of succession can be searched by process and stack every unsearched relation until a terminator is located. A scoring module can assign a score to each chain of succession that is non-circular. The score can be computed using the number of relations in the chain and a chain score based on the account predecessor, the account successor, and the external status. The reconciliation module can reconcile the tentative order with any permanent order developed in any previous file to create a card account relationship. A credit risk analysis module can receive the card account relationship from the reconciliation module and to perform a credit risk analysis based on the card account relationship.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
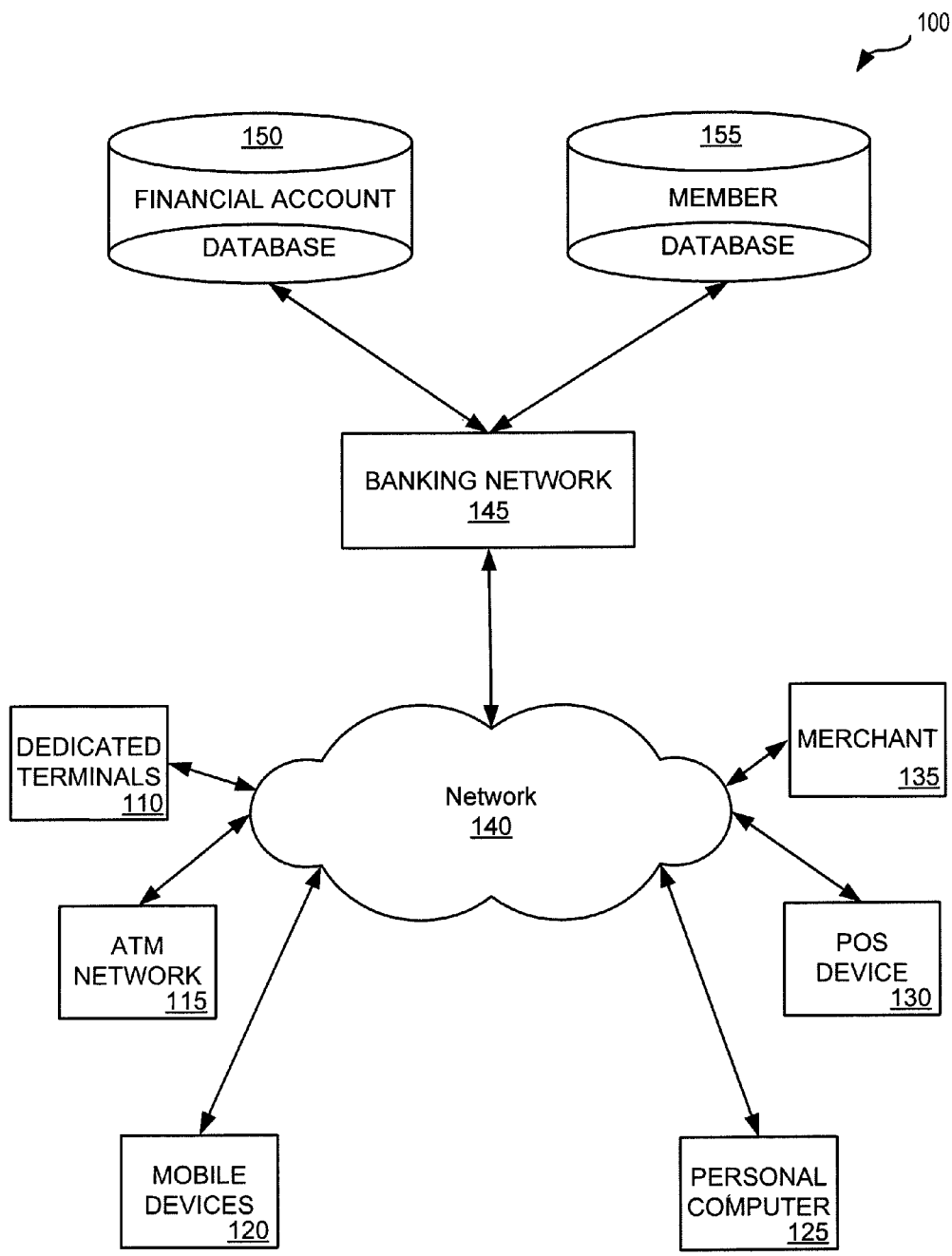
FIG. 1 illustrates an example of an operating environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to credit card relationships. More specifically, various embodiments relate to credit card relationship derivation from historic data. A single credit card relationship between a membership organization and a member can be very long-lived and identified by many different account numbers over time. For example, a new card with a new number can be issued if the card is lost, stolen, the member changes the card type (Standard, Gold or Platinum) or the card number is thought to be compromised. Sometimes, data security compromises committed by third-parties can result in a simultaneous mass re-issue of many cards. Various embodiments of the present invention create a common key and ordinal numbers that identifies the account throughout its life by resolving ambiguities and inconsistencies in historical data. Examples of inconsistencies and ambiguities in the historical data can include, but are not limited to invalid account numbers, an account listing itself as a predecessor and/or successor, and others.

Once constructed, the credit card account relationship can be used in a variety of manners. For example, a credit risk analysis to asses the risk of a credit decision without the entire historic account relationship leaves analysts blind to events in the relationship that occurred before a card was replaced. Also, privacy requirements preclude the use of real credit card numbers in analytical data. Thus, the AcctID-order combination generated by embodiments of the present invention forms a natural surrogate key that is both more useful than the real card number and honors privacy requirements by masking the data in a way that is not externally meaningful. In addition, the AcctID-order is robust to the re-using of card numbers for different member. As another example, the credit card account relationship data can be used to satisfy requirements from the Office of Thrift Supervision (OTS) for more rigorous analysis and loss forecasting.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

FIG. 1 illustrates an example of an operating environment 100 in which some embodiments of the present invention may be utilized. The embodiments of the present invention illustrated in FIG. 1 allow user interactions through various points of interaction such as, but not limited to, dedicated terminals 110 (e.g., public terminal or kiosk), ATM networks 115 (e.g., interbank ATM network and intrabank ATM networks), mobile devices 120 (e.g., mobile phone), personal computers 125, point of sale (POS) devices 130, and merchants 135. These points of interaction can include mechanisms for credit card transactions, connect through network 140 to banking network 145, and may run one or more applications or clients that allow a user to interact with the banking network (e.g., by submitting a credit card transaction for processing). Such applications may provide access to credit card processing systems and interfaces along with traditional banking functionality such as withdrawals, balance inquiries, deposits, transfers, etc.

Dedicated terminals 110 such as public terminals/kiosks may be computers available to the public and/or specially designed kiosks that interact with banking network 140. ATM networks 115 can be any set of ATMs in an interbank ATM network and/or intrabank ATM network. Mobile devices 120 may be cellular phones, smart phones (a smart phone being a cellular phone that has capabilities and features such as, but not limited to, internet access, a full keyboard, email access, Wi-Fi connection capabilities, BLUETOOTH connectivity, or any other functionality of a computer), tablet computers (a portable computer having a touch interface), netbooks, laptops possibly with a wireless connection (such as an 802.11a/b/g connection or mobile broadband connection, such as via a 3G or 4G wireless network). Personal computers 125 may be any computer (e.g., desktop computers, laptop computers, netbooks, tablet computers, Internet-enabled television devices, etc.) connected to network 140. POS devices 130 can be any device used as a checkout for a merchant. For example, POS device 130 can be a terminal located at the merchant 135, a computer-based interface such as a webpage or custom application, a telephone payment system, and others.

Banking network 145 may include any number of membership organizations, banks, credit unions, or other financial institutions. In accordance with embodiments of the present invention, banking network 145 can use a variety of interaction methods, protocols, and systems. For example, banking network 145 can use any of the automated clearing house (ACH) networks. An ACH network may be operated by NACHA (previously referred to as the National Automated Clearing House Association). Another ACH network may be the Electronic Payments Network (EPN). These ACH networks may interact to settle ACH transactions involving a party that has a relationship with only NACHA's ACH network or only the EPN. Other banking networks, such as CIRRUS, NYCE, and PULSE may also be used.

As illustrated in FIG. 1, banking network 145 can be communicably coupled to one or more databases such as financial account database 150 and member database 155. These databases can have a variety of information that can be utilized by one or more banking systems (e.g., check processing system, credit card processing system, a credit card relationship derivation system, etc.). For example, financial account database 150 includes account information for members of a financial institution. Member database 155 stores information about members (or customers) of a membership organization (or financial institution). For example, membership database 155 can include information such as employer, total balance of all accounts held at the membership organization, credit ratings, home ownership information, annual salary, length of membership, and/or other information. In some embodiments, these two databases can be integrated into one database. A computer system associated with a membership organization, a bank, a credit union, or other financial institution within banking network 145 may be able to access these (and other) databases for account information, customer information, and other stored information. Banking network 145 can use one or more computers to derive credit card account relationship data from historic data provided by a credit card issuer that is stored in an available database.

Figure 2:
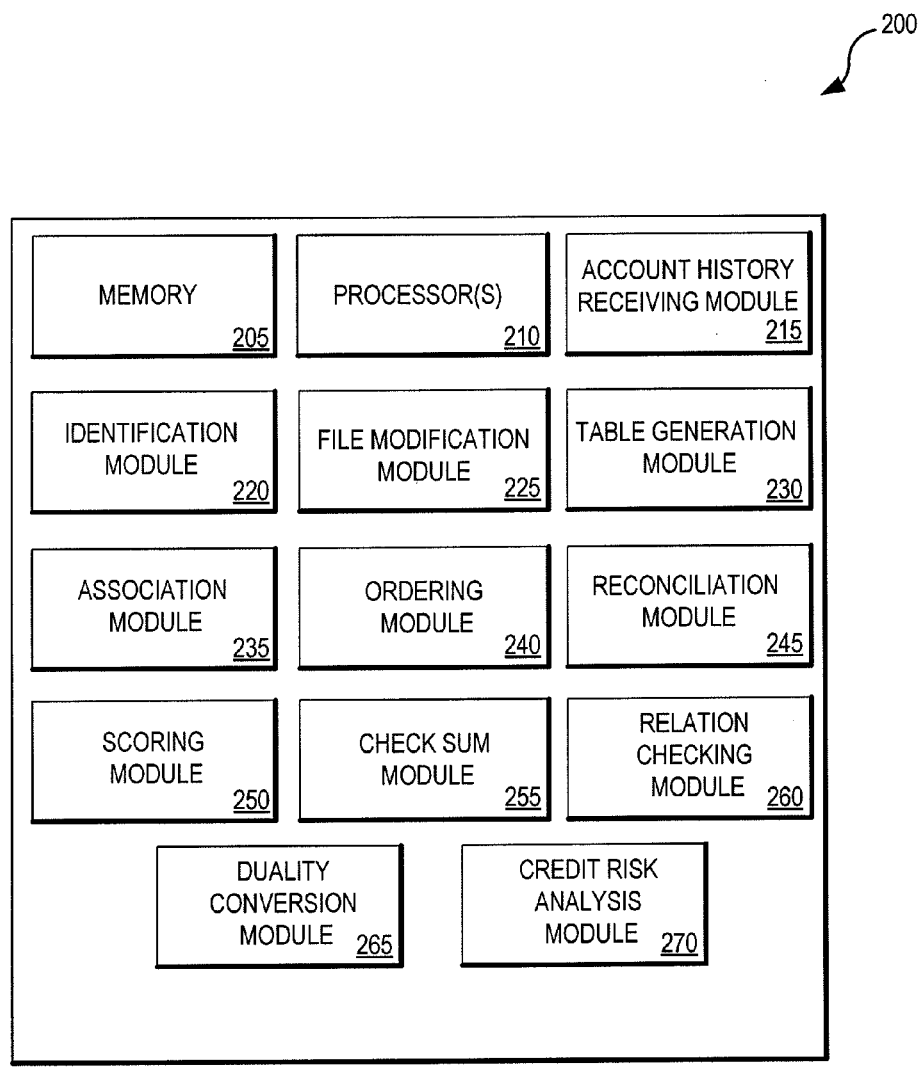
FIG. 2 is a block diagram illustrating exemplary components of a credit card relationship derivation system in accordance with one or more embodiments of the present invention.

FIG. 2 is a block diagram illustrating exemplary components of a credit card relationship derivation system 200 in accordance with one or more embodiments of the present invention. According to the embodiments shown in FIG. 2, the credit card account relationship derivation system 200 can include memory 205, one or more processors 210, account history receiving module 215, identification module 220, file modification module 225, table generation module 230, association module 235, ordering module 240, reconciliation module 245, scoring module 250, checksum module 255, relation checking module 260, duality conversion module 265 and credit risk analysis module 270. Other embodiments of the present invention may include some, all, or none of these modules and components along with other modules, applications, and/or components. For example, some embodiments may include an encryption/decryption module to encrypt and decrypt messages transmitted and received. Still yet, some embodiments may incorporate two or more of these modules into a single module and/or associate a portion of the functionality of one or more of these modules with a different module. For example, in one embodiment, the functionality associated with checksum module 255 and relation checking module 260 can be incorporated into a single module.

Memory 205 can be any device, mechanism, or populated data structure used for storing information. In accordance with some embodiments of the present invention, memory 205 can encompass any type of, but is not limited to, volatile memory, nonvolatile memory and dynamic memory. For example, memory 205 can be random access memory, memory storage devices, optical memory devices, media magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of account history receiving module 215, identification module 220, file modification module 225, table generation module 230, association module 235, ordering module 240, reconciliation module 245, scoring module 250, checksum module 255, relation checking module 260, duality conversion module 265, and/or credit risk analysis module 270.

Account history receiving module 215 can receive, on a periodic basis (e.g., monthly), a current file containing account level data for a plurality of credit card accounts. The account level data can include a current account number, an account predecessor, an account successor, and/or an external status. The following table provides an example of account level data that may be received from a credit card processor. In particular, Table 1 shows how the data can appear when received from a credit card processor; however the first several digits of the numbers have been replaced with an 'X' for security reasons. An Account Number is always present. If the account had a predessor that number is provided, and if the account has (or will be) superseded by a successor, that number is provided.

TABLE 1

Exemplary Data from Credit Card Processor

| Precessessor | Account Number | Successor |
|---|---|---|
| XXXXXXXXXXXX8660 | XXXXXXXXXXXX4157 | |
| XXXXXXXXXXXX6889 | XXXXXXXXXXXX4165 | |
| XXXXXXXXXXXX9553 | XXXXXXXXXXXX4173 | |
| XXXXXXXXXXXX5319 | XXXXXXXXXXXX4181 | XXXXXXXXXXXX3746 |
| XXXXXXXXXXXX4493 | XXXXXXXXXXXX4199 | |
| XXXXXXXXXXXX2320 | XXXXXXXXXXXX4207 | |
| XXXXXXXXXXXX0490 | XXXXXXXXXXXX4363 | XXXXXXXXXXXX2659 |
| XXXXXXXXXXXX8045 | XXXXXXXXXXXX4371 | XXXXXXXXXXXX2467 |
| XXXXXXXXXXXX5172 | XXXXXXXXXXXX4389 | XXXXXXXXXXXX2588 |
| XXXXXXXXXXXX0577 | XXXXXXXXXXXX4512 | XXXXXXXXXXXX8852 |
| | XXXXXXXXXXXX0031 | |
| | XXXXXXXXXXXX0049 | |
| | XXXXXXXXXXXX0106 | |
| | XXXXXXXXXXXX0130 | |
| | XXXXXXXXXXXX0155 | |
| | XXXXXXXXXXXX0486 | XXXXXXXXXXXX4018 |
| | XXXXXXXXXXXX0726 | XXXXXXXXXXXX6277 |
| | XXXXXXXXXXXX0999 | XXXXXXXXXXXX8761 |
| | XXXXXXXXXXXX1062 | XXXXXXXXXXXX3879 |
| | XXXXXXXXXXXX2904 | XXXXXXXXXXXX4685 |

The credit card processor that provides the historic data file of account level data does not necessarily validate the fields in the file. As a result, the historic credit card data can contain inconsistent and erroneous relationships between credit card accounts and their predecessors and successors. In addition, historic relationships are typically only available as monthly snapshots, and there is no clear way to tell exactly when a card was issued, because the issue dates are only accurate within about 10 days, and not necessarily in the correct order. Hence, historic predecessor and successor relations can be inaccurate and contradictory. In addition, account numbers may have been re-used.

Identification module 220 can identify a subset of the plurality of credit card accounts that contain incorrect account level data. For example, an account may list itself as the predecessor account or the successor account, which is meaningless. An account may name the same account as both the predecessor account and the successor account, which is impossible. As another example, some predecessor account numbers or successor account numbers may fail the industry-standard card number checksum test, and thus cannot be correct. In some embodiments, the credit card issue may only issue MasterCard account numbers which can be converted to Visa accounts before being issued to the member. As such, if the member service representative (MSR) typed in a Visa account as the predecessor or successor, the account will need to be converted (e.g., using a duality conversion) to an internal MasterCard account before it can be matched with another record. Some cards name their predecessors or successor as a different card type: American Express vs. MasterCard (after duality conversion from Visa). Before the add-a-card solicitation began offering American Express cards in June, 2009, this was impossible. Some financial institutions may not permit a card to be preceded or superseded by a card of a different type. If so, the presence of different types in the same input record indicates an error. In other cases, the conversions may be between different card types and/or begin occurring at different dates.

File modification module 225 can be communicable coupled to identification module 220 and be configured to receive the subset of the plurality of credit card accounts that contain incorrect account level data. From this data, file modification module 225 can create a modified file from the current file received from account history receiving module 215. The modified file has the subset of the plurality of credit card accounts marked as inaccurate and known inconsistencies corrected.

Table generation module 230 can generate an ID table from a previous file (e.g, previous month's data). The ID table can include account numbers, unique account id's (AcctID) associated with the account numbers, a member number, and/or a date stamp (e.g., ID_month containing month and year the AcctID was assigned to this account). Association module 235 can associate a unique account id and an ordinal number with each of the current account numbers in the current modified file. The account id identifies a relationship chain while the ordinal number represents the current account number's place in the chain.

In some embodiments, one of the unique account id's listed in the ID table can be associated with one of the current account numbers if the current account number is listed as one of the account numbers in the ID table. In this case, the source of the identification (ID_source) can be set to 'account.' A new unique account id can be assigned if the account predecessor is not indicated. The source of the identification can be set to 'new' and date stamp (ID_month) can be set to the current data month. One of the unique account id's can be associated with one of the current account numbers if the account predecessor is in the ID table and the member number of the account predecessor matches the member number of the current account. The source of the identification can be set to 'from' and the date stamp can be set to the current data month. As discussed in more detail below, the source of the identification can be used in some embodiment for assigning a score to a relationship chain.

In some embodiment, association module 235 can assign a unique account id to the remaining credit card accounts by tracing chains of predecessors and successors that exist only in the current month's data. Because the lengths of these chains are unlimited, and because they may create multiple branches (because multiple accounts may name the same predecessor and/or successor), some embodiments use an iterative approach. For example, if an account is listed as the successor of another current account with a known account id, accept that account id, set the source of the identification to 'to' and the date stamp to the current data month.

In some instances, several accounts can name this account as successor, so each of them must be checked. If a match is found, no member number check is needed, because both accounts exist in the same month and thus no possibility of account number re-use. In many cases, unlike predecessors, successor account numbers are seldom mis-keyed.

If this account's predecessor is in the current month's data, has a known account id, and the member numbers agree, accept that account id, set the source of the identification to 'from' and the date stamp as the current data month. For all accounts with an unknown account id, repeat the previous two steps as many times as needed to assign an account id to one, or to conclude that no more assignments are possible. This traces all branches of all chains as far as necessary.

Other embodiments of the present invention account for a "missing link" problem. For example, the chain of successors says A→B→C (i.e., A preceeds B preceeds C), but the chain of predecessors says A→C, or A→D→C. This presents interesting problems in trying to assign a correct order to cards B and D. The chain of successors says A→B and the chain of predecessors says B but the account "B" does not appear in the current month's data. However, the logic in several embodiments recognizes this case and link A to C.

As another example, suppose the successor account has not yet issued. Account A says B is its successor, but B does not appear in the current month's data. This can mean that A is the end of the chain, or it could be the case discussed above where B is a missing link. For the purpose of assigning an account id to accounts, if account "C" lists "B" as its predecessor, and "C" did not exist last month, account "B" cannot be old enough to have been purged. Thus, some embodiments not necessarily search for an A→B relation to provide the account id for account C. However, the "missing link" condition does arise in trying to assign the order of accounts with a common account id. In one or more embodiments, any remaining unassigned accounts are assigned a new account id. This approach errs on the side of erroneously assigning a new account id, rather than erroneously linking two unrelated accounts, and thus drawing incorrect conclusions.

Ordering module 240 can create a tentative order for each of the unique account id's based on a scoring model by iteratively processing chains of succession of unresolved credit cards listed in the modified file. For example, ordering module 240 can determine a set of starting places for each unique account id and iteratively process and stack (i.e., merge) a relation starting with one of the starting places in the set of starting places. This creates a chain of succession by matching the account predecessor of one of the plurality of credit card accounts with the account successor of one of the plurality of credit card accounts until a terminator is located. Every branch in the chain of succession can be searched by process and stack every unsearched relation until a terminator is located.

The following is an example of the iterative process. Suppose the input data contains the following relations, where the letters A, B, etc. refer to account number. There can be up to two relations per input record (predecessor to account and account to successor). Suppose these relations exist in the input data:

A→B, B→C, B→D, C→E, D→F, C→F, E→none, F→none

The following chains are possible:
A→B→C→E→F
A→B→C→F $$A \rightarrow B \rightarrow D \rightarrow E$$

These chains are discovered by beginning with A, and tracing each possible path.

In some cases, cards and member numbers can change in the same month. The primary responsibility of a card may change because of the death or divorce of a member, and the account number and other account attributes, like the credit limit, may change at the same time. Similarly, transfer dates are often inconsistent. Examination shows that if several cards are issued within the same 30-day period, cards issued later in the chain may have earlier transfer dates.

Each account nominally has both a predecessor and successor. Thus, each relationship has the potential to be verified on both ends. For example, account A names account B as its successor (A→B) and B names A as its predecessor (A←B). However, they frequently disagree. The most common case is A→B and B→C but A←C. Other cases appear as A→B→C→E and A←C←D←E.

Scoring module 250 can assign a score to each chain of succession that is non-circular. A circular relation can occur in the chain of accounts: A→B→C→A, or the reverse. The score can be computed using the number of relations in the chain and a chain score based on the account predecessor, the account successor, and the external status. Within an account id, the various relationships can be combined into different "chains" of succession. The longest chain is selected, with a chain score used to break ties. According to some embodiments, the chain score is the sum of the score values of each relation in the chain.

The reconciliation module 245 can reconcile the tentative order with any permanent order developed in any previous file to create a card account relationship. Ideally, this would simply add a constant to the tentative orders to cause their numbering to be consistent with permanent orders. Occasionally, information learned in a later month can cause a new account to be inserted between two existing accounts in the order. In some embodiments, the new account will be assigned a fractional order that is the average of the ordinal number associated with the two the new account will fall between. For example, for an account id

| Accounts | A | B | C | D | E | F | G | H | T |
|---|---|---|---|---|---|---|---|---|---|
| Previous orders | 1 | 2 | . | 3 | 4 | 5 | 6 | 7 | . |
| Current month | . | . | 1 | 2 | . | . | 3 | . | 4 |
| After processing | 1 | 2 | 2.5 | 3 | 4 | 5 | 6 | 7 | 8 |

A dot in these charts means the account is absent or unchained the data. In some embodiments, the Previous and Current lists separately are sorted (e.g., using a sort key or manually). Then the accounts have both a current-month and final order (here accounts D and G) as reference points. Account C can be inserted before D, and a conclusion can be drawn that account T is the end of the chain. Notice that ambiguity is resolved by assuming that new accounts are newer than old ones, that current information is more reliable than previous information. Other embodiments can score these relationships and select the more credible chain.

Accounts that are not (as of yet) part of any selected chain in any month are assigned a negative order. Unlike positive orders, negative orders are only identifiers; their magnitude does not matter. However, if such an account is later assigned a place in a selected chain, the account will be re-assigned a positive order based on its position in the chain. In accordance with various embodiments, this circumstance is an example of how an order can change. In accordance with one or more embodiments the order is never zero or missing. In the some cases (e.g., circular chains, etc.), the historic order and current order of accounts that include both may be different. Some embodiments use the new order since that is based d on the most recent information. Other embodiments clean up the member service representative (MSR) procedures to prevent circular and ambiguous chains.

In one or more embodiments, for example, a checksum module 255 can perform a credit card checksum test on the plurality of credit card accounts and record which of the plurality of credit card accounts fail the credit card checksum test. A relation checking module 260 can also be used to record which of the plurality of credit card accounts list the current account number as the account predecessor or the account successor. A duality conversion module 265 can convert a Visa card number to a MasterCard number when this is identified as an inconsistency. Credit risk analysis module 270 can receive the card account relationship from the reconciliation module and perform a credit risk analysis based on the card account relationship.

Figure 3:
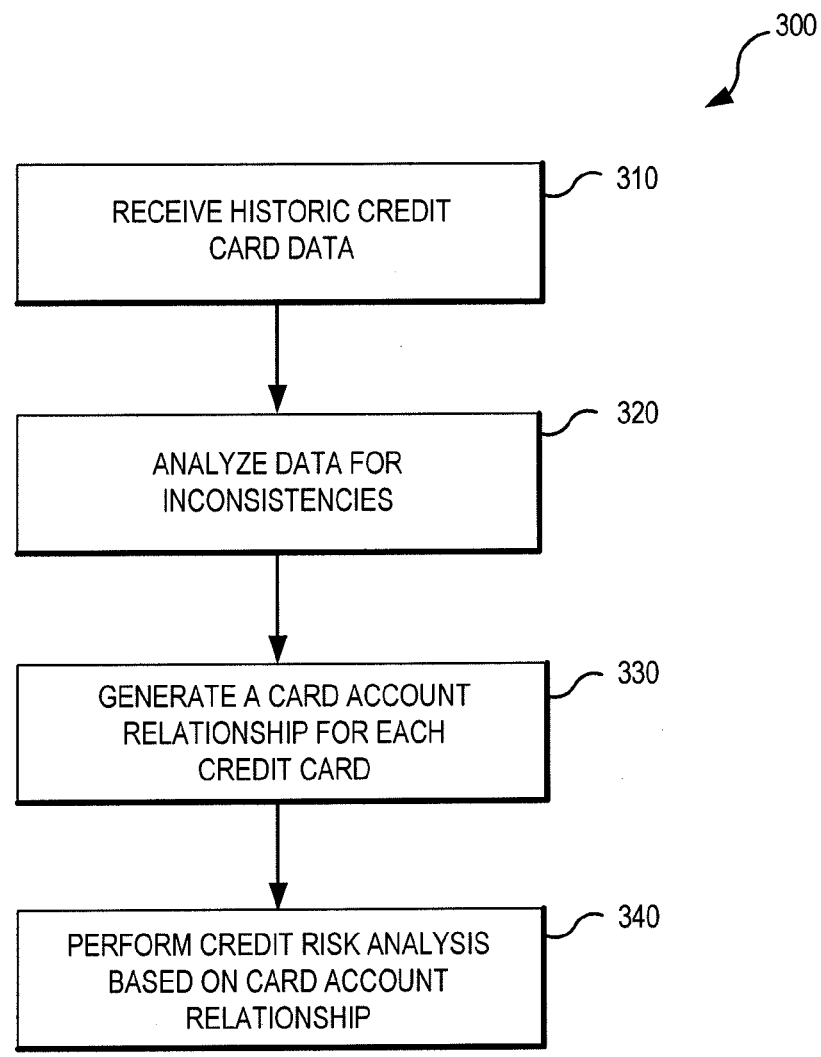
FIG. 3 is a flow chart illustrating a set of exemplary operations for performing a credit risk analysis in accordance with various embodiments of the present invention.

FIG. 3 is a flow chart illustrating a set of exemplary operations 300 for performing a credit risk analysis in accordance with various embodiments of the present invention. As illustrated in FIG. 3, receiving operation 310 receives historic credit card data. The historic credit card data can contain inconsistent and erroneous relationships between credit card accounts and their predecessors and successors. Analysis operation 320 looks for these inconsistencies and errors in the data.

As will be discussed in more detail below, these errors and inconsistencies can be either fixed or marked to allow for generation operation 330 to generate a card account relationship for each credit card account in the historic data that was received in receiving operation 310. Account numbers may have been re-used over time. As a result, the account numbers cannot be matched to account id's by a simple table that uses only the account number as a key. Specifically, if account B says that the predecessor was account A, the switch from A to B may have happened ten years ago, and account A could have since re-issued to another member. While many credit card issuer's attempt to avoid re-issuance of card numbers, many cannot guarantee this has not, and will not, happen. This is not the case for successors, because if in current historic data file, account A says B is his successor, account A must have existed within the last three months.

Using the card account relationship risk analysis operation 340 performs a credit risk analysis. For example, the entire card account relationship leaves connects events (e.g., missed/late payments, charge offs, etc.) in the relationship that occurred before a card was replaced allowing for a more complete risk analysis. For example, a credit card account relationship can exist for an extremely long time; 20 years or more is quite common. Current account data contains only limited payment history; so risk analysts often examine the entire available account history. If the relationship has changed account numbers many times, perhaps because a card was lost, stolen or re-issued, the analyst must know all prior account numbers to access the complete history of the relationship, as well as to locate the information what was used to approve the original application for the account. All of this data can be relevant in analyzing the quality of the account, and the probability of future loss.

Figure 4:
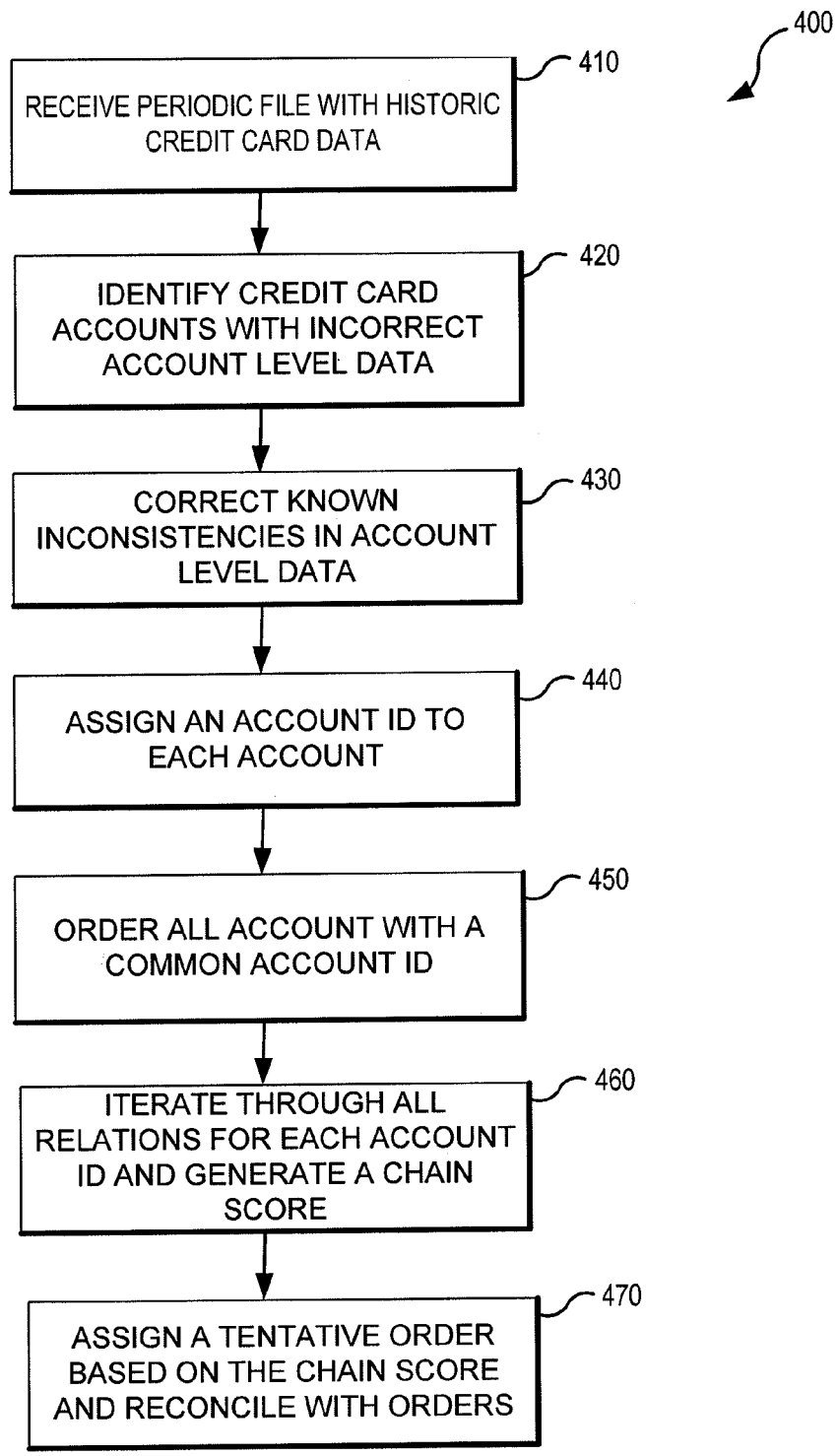
FIG. 4 is a flow chart illustrating a set of exemplary operations for deriving a credit card account relationship in accordance with some embodiments of the present invention.

FIG. 4 is a flow chart illustrating a set of exemplary operations 400 for deriving a credit card account relationship in accordance with some embodiments of the present invention. Receiving operation 410 receives a file historic credit card data. This file is typically supplied on a periodic basis (e.g., monthly or weekly). The historic credit card data can contain incorrect account level data such as inconsistent and erroneous relationships, mistyped account numbers, and others. Identification operation 420 identifies credit card account with incorrect account level data (see, e.g., FIG. 5). Known inconsistencies can be corrected in correction operation 430 (see, e.g., FIG. 6). Each account is assigned an account id in id assignment operation 440 (see, e.g., FIG. 7).

Order operation 450 orders all account with a common account id. A chain score is generated in scoring operation 460. For example, in some embodiments, each relation is a from-to pair, including relations with blank predecessors and successors, and is scored as follows:

30 if an account has no successor, and the external status is blank or A, meaning "OK" or temporarily "Authorization Prohibited".

20 if an account has no successor, and a different external status.

20 if an account has no predecessor, indicating it begins a chain.

20 if account A says B is his successor, and B says A is his predecessor, indicating a verified relation.

10 if B says A precedes him, but A says his successor is Y, Y exists this month.

9 if B says C succeeds him, but C says his predecessor is Y, Y exists this month.

8 if the named predecessor or successor does not exist this month.

The non-existent account may have been purged, it may not yet exist, or it may be a keying error. Please note that each credit card issuer record creates two different from-to relations, one for the account's predecessor and one for its successor. The only exception is verified relations, where two different records contribute to a single relation.

Chain scores are developed from the relation scores by iterating through all relations for this account id, beginning at each possible starting place. A starting place is either a known starting relation (e.g., with score 20 or above), or a relation with a non-existent "from" half (e.g., score 8 or above). The latter occurs when the predecessor account has been purged. The next relation whose "from" half matches the "to" half of the starting relation continues the chain. Embodiments of the present invention continue by iteratively searching and stacking relations until it either a finds a terminator (a relation with a blank or absent "to" half) or determines the chain is circular by noting that the next relation's "to" half matches the "from" half of a relation already in the stack. At this point, one complete chain has been found. The chain's relations from the stack can be recorded, and the chain's score can be calculated as the sum of the scores of the relations, including the starting and terminating relations. If the chain was circular, it divides the score by two.

All unsearched relations that may branch out at any point along the way can also be considered. Some embodiments follow each branch to a terminator, to make sure all possible chains have been located and scored with the given starting point. The next starting point can then be considered until exhaustion. In some cases, there may be no starting points at all. This means that all "from" relations point to other accounts, so all chains are circular. If so, the steps above are repeated, but every relation is taken as a starting point. Of course, this will find many overlapping chains, but the scoring will select the longest one. Very few account id's have this problem, so very little resources are wasted creating these overlapping chains.

According to some embodiments, for each non-circular chain, a score can be calculated (e.g. using scoring module 250). In one or more embodiments, the score can be a depth-score which can be computed as a constant (e.g., 1000) times the number of relations in the chain plus the chain score. This favors long chains over short ones, and uses the score as a tie-breaker. In the very unlikely event that the scores tie, experience has shown that the identity of the account at the end will be the same for both chains, so either chain can be taken arbitrarily. If all chains are circular, the same algorithm is used. Circular chains are a last resort. The selected chain can be used to assign a tentative order to each account. Reconciliation operation 470 assigns a tentative order based on the chain score and the tentative order is reconciled with previously assigned orders generated from other prior data sets.

Figure 5:
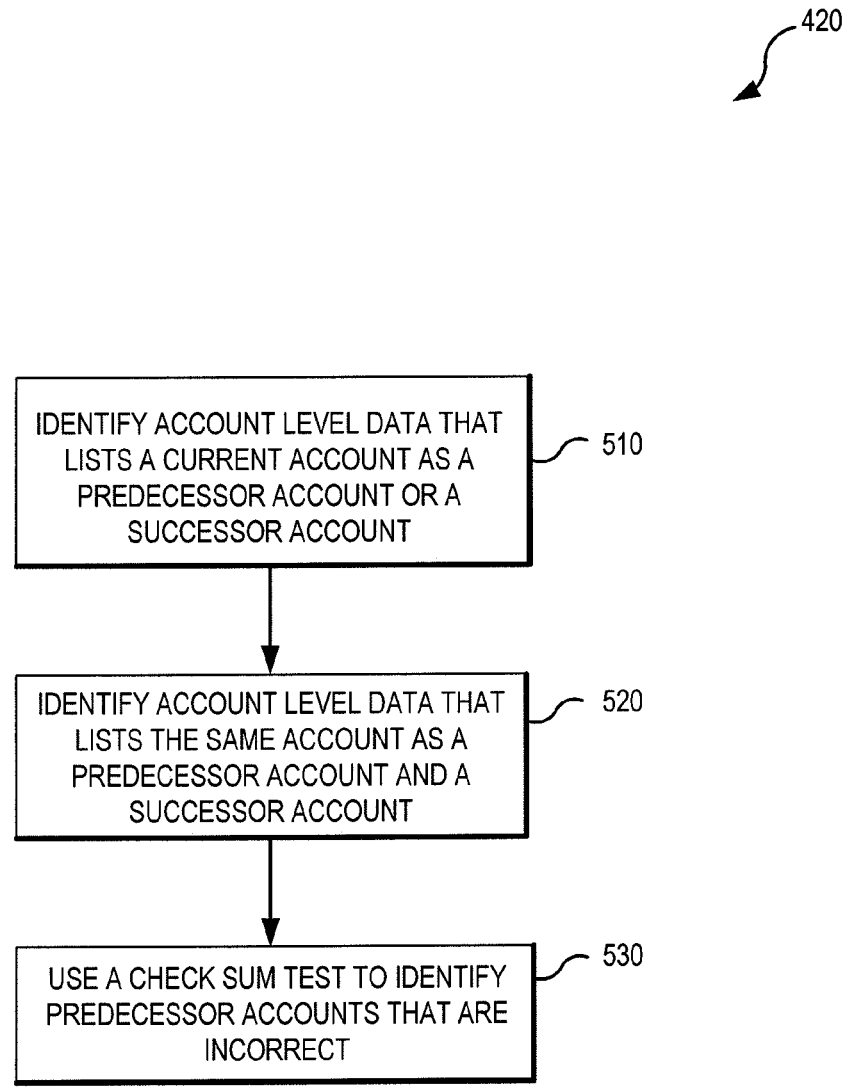
FIG. 5 is a flow chart illustrating a set of exemplary operations for identifying credit card accounts with incorrect account level data in accordance with one or more embodiments of the present invention.

FIG. 5 is a flow chart illustrating a set of exemplary operations 420 for identifying credit card accounts with incorrect account level data in accordance with one or more embodiments of the present invention. Identification operation 510 identifies account level data that lists a current account as a predecessor account or as a successor account. If either the predecessor account or the successor account is listed as the account number, the predecessor account or the successor can be changed to "X-Same" to mark it invalid. Next, account level data that lists the same account as a predecessor account and as a successor account are identified in identification operation 520. Each nonblank predecessor account and successor account that are identified as the same can both marked invalid: predecessor='X=successor'; successor= 'X= predecessor';

Checksum operation 530 uses a checksum test to identify if the predecessor account and/or the successor account are incorrect. If either account fails the credit card checksum test, the first character is changed to 'X' to mark it invalid. For example, the checksum test can use the Luhn formula (Mod 10) to validate the account number. In accordance with the Luhn formula, the check digit (16th for MC/Visa, 15th for Amex) obeys Mod(checksum+checkdigit,10)=0, where checksum=sum(digit or double(digit)) for each digit, applying double ( ) to every other digit working right to left, beginning with the digit to the left of the check digit. Thus, Visa/MC uses double ( ) for every odd digit from the 1st to 15, and American Express for every even digit from the 2nd to 14. For this purpose, double(digit)=sum(of digits in 2*digit), for example, double(7)=5 because 7*2=14, then 1+4=5.

Figure 6:
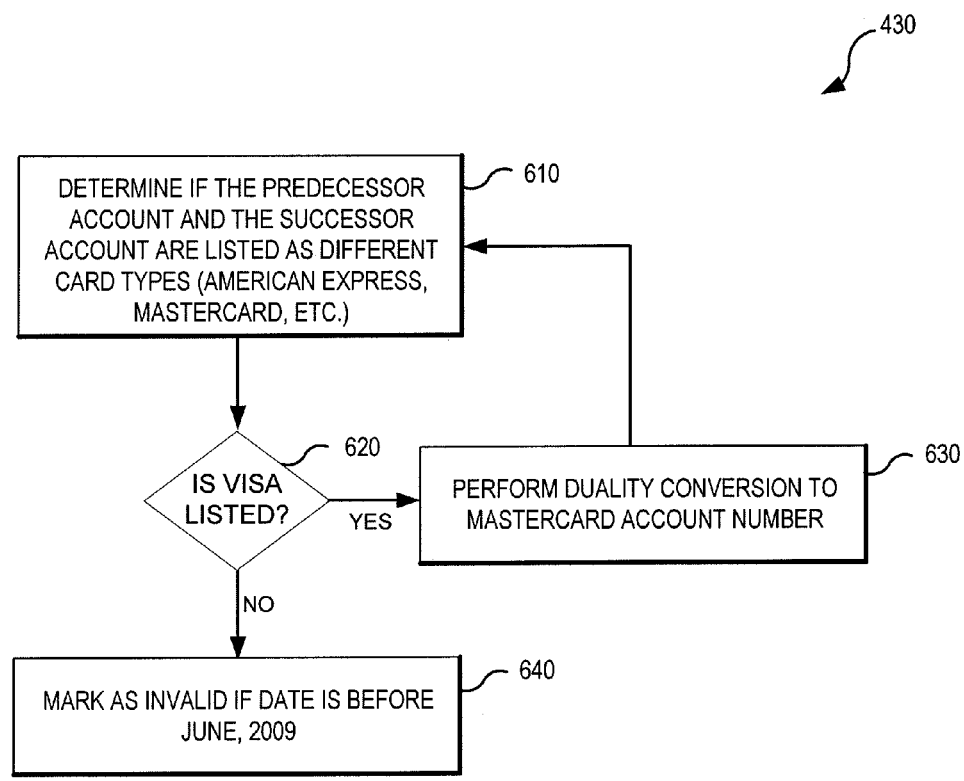
FIG. 6 is a flow chart illustrating a set of exemplary operations for correcting known inconsistencies in account level data in accordance with various embodiments of the present invention.

FIG. 6 is a flow chart illustrating a set of exemplary operations 430 for correcting known inconsistencies in account level data in accordance with various embodiments of the present invention. Determination operation 610 determines if the predecessor account and the successor account are listed as different card types (e.g., American Express, Mastercard, Visa, etc.) Listing operation 620 determines if the predecessor account or the successor account is listed as a Visa. If so, listing operation 620 branches to conversion operation 630 were a duality conversion is performed to convert the Visa account number (begins with a '4') to a MasterCard account number. After conversion operation 630, determination operation 610 is repeated. If listing operation 620 determines that neither the predecessor account nor or the successor account is listed as a Visa, listing operation 620 branches to marking operation 640 which marks the entry as invalid if the date is before June 2009. In some embodiments, the first digit is of the non-matching predecessor or successor replaced with an 'A' for American Express or 'M' for MasterCard to mark it invalid for matching purposes. After June 2009, it is possible for an American Express to be successor of a MasterCard, but not the converse.

Figure 7:
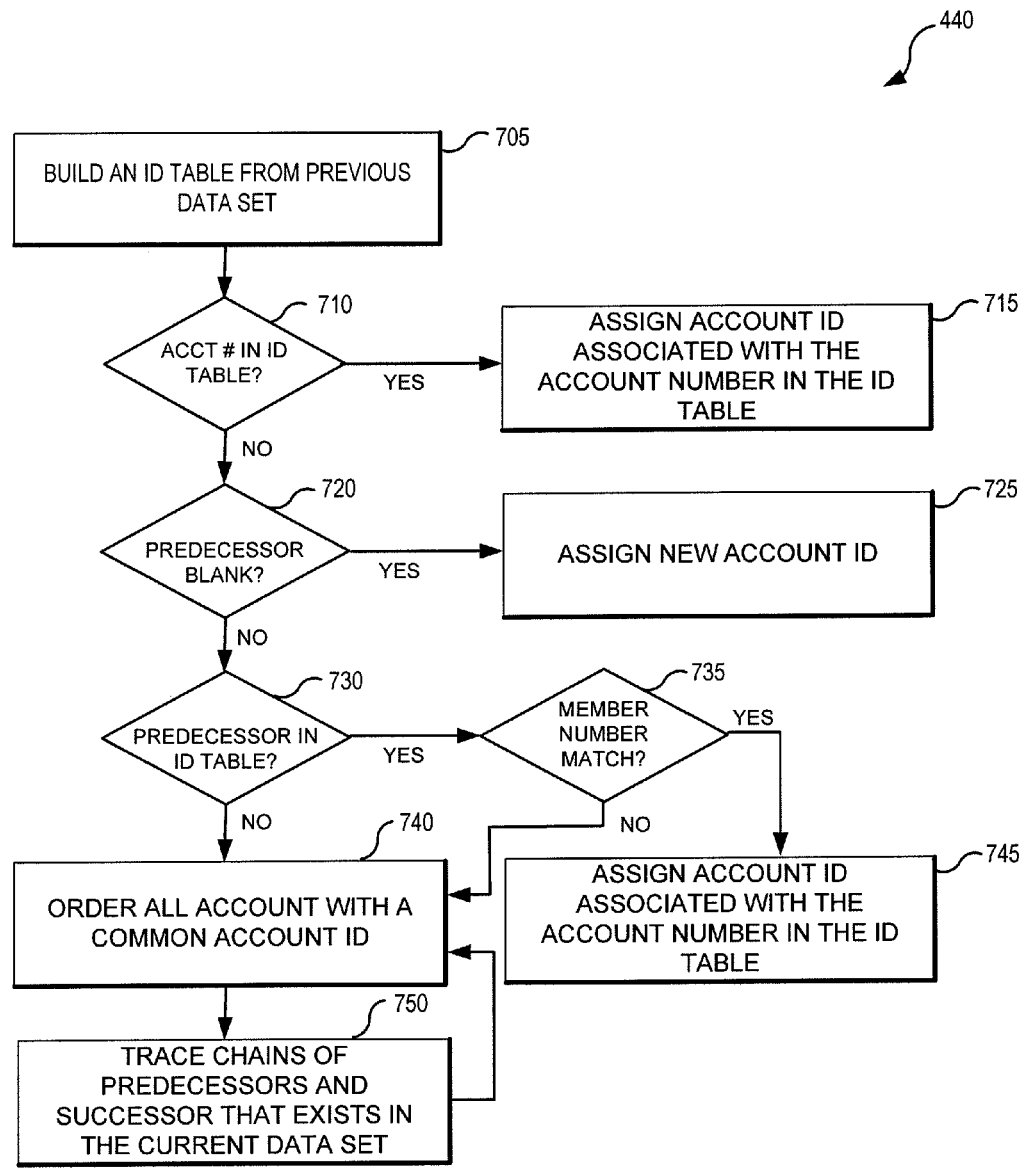
FIG. 7 is a flow chart illustrating a set of exemplary operations for assigning an account id in accordance with some embodiments of the present invention.

FIG. 7 is a flow chart illustrating a set of exemplary operations 440 for assigning an account id in accordance with some embodiments of the present invention. Table generation operation 705 generates an ID table from a previous file (e.g, previous month's data). The ID table can include account numbers, unique account id's (AcctID) associated with the account numbers, a member number, and/or a date stamp (e.g., ID_month containing month and year the AcctID was assigned to this account). For each entry in the current historic data file, account number determination operation 710 determines if the account number is in ID table. If the account number is in the ID table, then account number determination operation 710 branches to assignment operation 715 where the account id associated with the account number in the ID table is assigned to the account number.

If the account number is not in the ID table, then account number determination operation 710 branches to predecessor determination operation 720. If no account predecessor is listed, then predecessor determination operation 720 branches to new assignment operation 725 where a new account id is assigned to the account number.

If an account predecessor is listed, then predecessor determination operation 720 branches to predecessor table operation 730 where a determination is made as to whether the predecessor is listed in the ID table. If a determination is made that the predecessor is listed in the ID table, predecessor table operation 730 branches to member match operation 735 which determines if the member numbers match. If member match operation 735 determines that the member number in the entry of the current history data file matches the member number in the ID table, then member match operation 735 branches to association operation 745 which assigns the account id associated with the account number in the ID table. Member match operation 735 branches to order operation 740 if a determination is made that the member number in the entry of the current history data file does not match the member number in the ID table. Similarly, predecessor table operation 730 branches to order operation 740 if a determination is made that the predecessor account is not listed in the ID table.

Order operation 740 can create a tentative order for each of the unique account id's (e.g., based on a scoring model) by using processing operation 750 to iteratively processing chains of succession of unresolved credit cards listed in the modified file. This continues until every branch in the chain of succession can be searched by processing and stacking every unsearched relation until a terminator is located.

Exemplary Computer System Overview

Figure 8:
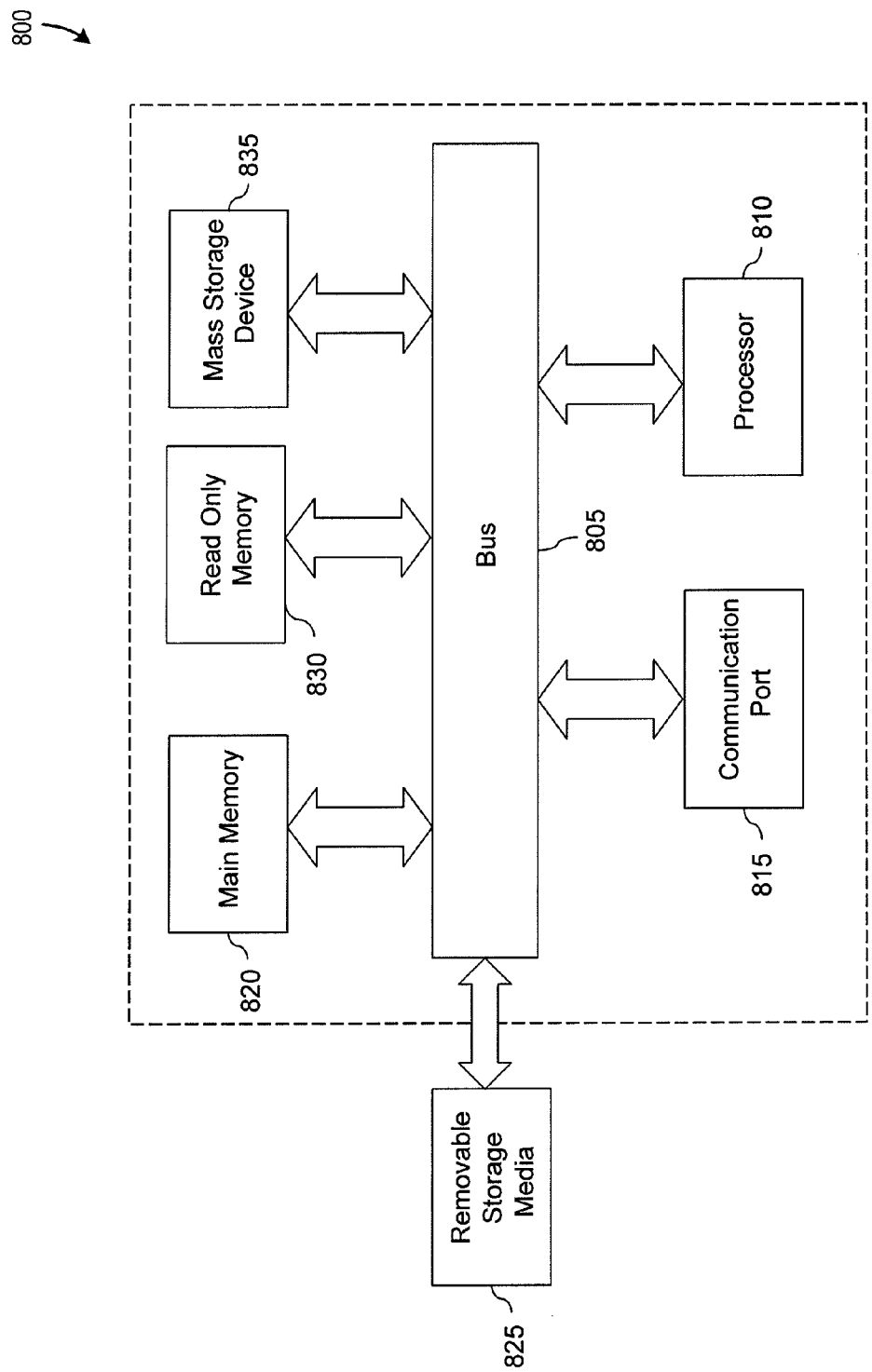
FIG. 8 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 800 with which embodiments of the present invention may be utilized. According to the present example, the computer system includes a bus 805, at least one processor 810, at least one communication port 815, a main memory 820, a removable storage media 825, a read only memory 830, and a mass storage 835.

Processor(s) 810 can be any known processor, such as, but not limited to, an Intel® Itanium® or Itanium 2® processor(s), or AMD® Opteron® or Athlon MP® processor(s), or Motorola® lines of processors. Communication port(s) 815 can be any of an RS-232 port for use with a modem based dialup connection, a 10/100 Ethernet port, or a Gigabit port using copper or fiber. Communication port(s) 815 may be chosen depending on a network such a Local Area Network (LAN), Wide Area Network (WAN), or any network to which the computer system 800 connects.

Main memory 820 can be Random Access Memory (RAM), or any other dynamic storage device(s) commonly known in the art. Read only memory 830 can be any static storage device(s) such as Programmable Read Only Memory (PROM) chips for storing static information such as instructions for processor 810.

Mass storage 835 can be used to store information and instructions. For example, hard disks such as the Adaptec® family of SCSI drives, an optical disc, an array of disks such as RAID, such as the Adaptec family of RAID drives, or any other mass storage devices may be used.

Bus 805 communicatively couples processor(s) 810 with the other memory, storage and communication blocks. Bus 805 can be a PCI/PCI-X or SCSI based system bus depending on the storage devices used.

Removable storage media 825 can be any kind of external hard-drives, floppy drives, IOMEGA® Zip Drives, Compact Disc-Read Only Memory (CD-ROM), Compact Disc-Re-Writable (CD-RW), and/or Digital Video Disk-Read Only Memory (DVD-ROM).

The components described above are meant to exemplify some types of possibilities. In no way should the aforementioned examples limit the scope of the invention, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to reconstructing credit card account relationships from historic data, embodiments of the present invention are equally applicable to various other account types (e.g., debit accounts, banking accounts, etc.). In addition, in some embodiments, a SAS program can be created to implement one or more of the methods described herein.

Also, for the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types of communication and computer devices and systems. In addition, embodiments are applicable to all levels of computing from the personal computer to large network mainframes and servers.

In conclusion, the present invention provides novel systems, methods and arrangements deriving card relationship histories from historic data. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A method comprising:
receiving, at a processor, on a periodic basis, a current file containing account level data for a plurality of credit card accounts, wherein the account level data includes a current account number, an account predecessor, an account successor, and an external status;
constructing, using the processor, a subset of the plurality of credit card accounts that contains incorrect account level data;
creating, using the processor, a modified file from the current file with the subset of the plurality of credit card accounts marked as inaccurate and by correcting known inconsistencies;
generating, from an immediately prior file, using the processor, an ID table that includes account numbers, unique account id's associated with the account numbers, a member number, and a date stamp;
associating, using the processor, with each of the current account numbers in the modified file a unique account id and an ordinal number, wherein one of the unique account id's listed in the ID table is associated with the one of the current account numbers if the current account number is listed as one of the account numbers in the ID table, a new unique account id is assigned if the account predecessor is not indicated, and one of the unique account id's is associated with one of the current account numbers if the account predecessor is in the ID table and the member number of the account predecessor matches the member number of the current account;
creating, using the processor, a tentative order for each of the unique account id's based on a scoring model by iteratively processing chains of succession of unresolved credit cards listed in the modified file; and
reconciling the tentative order with any permanent order developed in any previous file to create a card account relationship.

2. The method of claim 1, wherein creating the tentative order comprises:
determining, using the processor, a set of starting places for each unique account id;
iteratively processing and stacking, by the processor a relation starting with one of the starting places in the set of starting places to create a chain of succession by matching the account predecessor of one of the plurality of credit card accounts with the account successor of one of the plurality of credit card accounts until a terminator is located; and
searching every branch in the chain of succession by processing and stacking every unsearched relation until a terminator is located.

3. The method of claim 2, further comprising assigning, using the processor, a score to each chain of succession that is non-circular, wherein the score is computed using the number of relations and a chain score based on the account predecessor, the account successor, and the external status.

4. The method of claim 2, wherein if no starting places are available the method further comprises:
iteratively processing and stacking, by the processor, every relation to create a chain of succession by matching the account predecessor of one of the plurality of credit card accounts with the account successor of one of the plurality of credit card accounts until a terminator is located; and
searching every branch in the chain of succession by processing and stacking every unsearched relation until a terminator is located.

5. The method of claim 1, wherein constructing, using the processor, the subset of the plurality of credit card accounts that contains incorrect account level data includes the following:
performing a credit card checksum test on the plurality of credit card accounts and recording which of the plurality of credit card accounts fail the credit card checksum test; and
recording which of the plurality of credit card accounts list the current account number as the account predecessor or the account successor.

6. The method of claim 1, further comprising performing a credit risk analysis based on the card account relationship.

7. The method of claim 1, wherein the external status is active, lost, stolen, or rescinded.

8. The method of claim 1, wherein correcting known inconsistencies includes using a duality conversion to convert a Visa card number to a MasterCard number.

9. A system comprising:
a memory;
a processor in connection with the memory, the processor operable to execute software modules comprising:
an account history receiving module configured to receive, on a periodic basis, a current file containing account level data for a plurality of credit card accounts, wherein the account level data includes a current account number, an account predecessor, an account successor, and an external status;
a identification module configured to identify a subset of the plurality of credit card accounts that contain incorrect account level data;
a file modification module configured to create a modified file from the current file with the subset of the plurality of credit card accounts marked as inaccurate and by correcting known inconsistencies;
a table generation module configured to generate, from an immediately prior file, an ID table that includes account numbers, unique account id's associated with the account numbers, a member number, and a date stamp;

an association module configured to associate with each of the current account numbers in the modified file a unique account id and an ordinal number, wherein one of the unique account id's listed in the ID table is associated with the one of the current account numbers if the current account number is listed as one of the account numbers in the ID table, a new unique account id is assigned if the account predecessor is not indicated, and one of the unique account id's is associated with one of the current account numbers if the account predecessor is in the ID table and the member number of the account predecessor matches the member number of the current account;

an ordering module configured to create a tentative order for each of the unique account id's based on a scoring model by iteratively processing chains of succession of unresolved credit cards listed in the modified file; and a reconciliation module configured to reconcile the tentative order with any permanent order developed in any previous file to create a card account relationship.

10. The system of claim 9, wherein the file modification module is further configured to create the tentative order by:
determining a set of starting places for each unique account id;
iteratively processing and stacking a relation starting with one of the starting places in the set of starting places to create a chain of succession by matching the account predecessor of one of the plurality of credit card accounts with the account successor of one of the plurality of credit card accounts until a terminator is located; and
searching every branch in the chain of succession by processing and stacking every unsearched relation until a terminator is located.

11. The system of claim 10, wherein the software modules further comprise a scoring module configured to assign a score to each chain of succession that is non-circular, wherein the score is computed using the number of relations and a chain score based on the account predecessor, the account successor, and the external status.

12. The system of claim 9, wherein the software modules further comprise:
a checksum module configured to perform a credit card checksum test on the plurality of credit card accounts and record which of the plurality of credit card accounts fail the credit card checksum test; and
a relation checking module configured to record which of the plurality of credit card accounts list the current account number as the account predecessor or the account successor.

13. The system of claim 9, wherein the software modules further comprise a credit risk analysis module configured to receive the card account relationship from the reconciliation module and to perform a credit risk analysis based on the card account relationship.

14. The system of claim 9, wherein the software modules a duality conversion module configured to convert a Visa card number to a MasterCard number.

15. A non-transitory computer-readable storage medium comprising computer-readable instructions which, when executed by one or more processors, cause the one or more processors to:

receive, on a periodic basis, a current file containing account level data for a plurality of credit card accounts, wherein the account level data includes a current account number, an account predecessor, an account successor, and an external status;
construct a subset of the plurality of credit card accounts that contains incorrect account level data;
create a modified file from the current file with the subset of the plurality of credit card accounts marked as inaccurate and by correcting known inconsistencies;
generate, from an immediately prior file, an ID table that includes account numbers, unique account id's associated with the account numbers, a member number, and a date stamp;
associate with each of the current account numbers in the modified file a unique account id and an ordinal number, wherein one of the unique account id's listed in the ID table is associated with the one of the current account numbers if the current account number is listed as one of the account numbers in the ID table, a new unique account id is assigned if the account predecessor is not indicated, and one of the unique account id's is associated with one of the current account numbers if the account predecessor is in the ID table and the member number of the account predecessor matches the member number of the current account;
create a tentative order for each of the unique account id's based on a scoring model by iteratively processing chains of succession of unresolved credit cards listed in the modified file; and
reconcile the tentative order with any permanent order developed in any previous file to create a card account relationship.

16. The non-transitory computer-readable storage medium of claim 15, wherein to create the tentative order the computer-readable instructions which, when executed by one or more processors, further cause the one or more processors to:
determine a set of starting places for each unique account id;
iteratively process and stack a relation starting with one of the starting places in the set of starting places to create a chain of succession by matching the account predecessor of one of the plurality of credit card accounts with the account successor of one of the plurality of credit card accounts until a terminator is located; and
search every branch in the chain of succession by processing and stacking every unsearched relation until a terminator is located.

17. The non-transitory computer-readable storage medium of claim 16, wherein the computer-readable instructions which, when executed by one or more processors, further cause the one or more processors to assign a score to each chain of succession that is non-circular, wherein the score is computed using the number of relations and a chain score based on the account predecessor, the account successor, and the external status.

18. The non-transitory computer-readable storage medium of claim 16, wherein if no starting places are available the computer-readable instructions which, when executed by one or more processors, further cause the one or more processors to:
iteratively process and stack every relation to create a chain of succession by matching the account predecessor of one of the plurality of credit card accounts with the account successor of one of the plurality of credit card accounts until a terminator is located; and search every branch in the chain of succession by processing and stacking every unsearched relation until a terminator is located.

19. The non-transitory computer-readable storage medium of claim 15, wherein to construct the subset of the plurality of credit card accounts that contains incorrect account level data the computer-readable instructions which, when executed by one or more processors, further cause the one or more processors to:

perform a credit card checksum test on the plurality of credit card accounts and recording which of the plurality of credit card accounts fail the credit card checksum test; and record which of the plurality of credit card accounts list the current account number as the account predecessor or the account successor.

20. The non-transitory computer-readable storage medium of claim 15, wherein the computer-readable instructions which, when executed by one or more processors, further cause the one or more processors to perform a credit risk analysis based on the card account relationship.

* * * * *